(12) United States Patent
Amatruda et al.

(10) Patent No.: US 6,272,927 B1
(45) Date of Patent: Aug. 14, 2001

(54) HERMETICALLY SEALED PRESSURE SENSING DEVICE

(75) Inventors: Andrew A. Amatruda, Attleboro, MA (US); Karl R. Abrahamson, Providence, RI (US); Steven Beringhause, Norton, MA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/421,488

(22) Filed: Oct. 20, 1999

(51) Int. Cl.[7] .................................................. G01L 9/12
(52) U.S. Cl. ................................................................ 73/718
(58) Field of Search ............................ 73/724, 718, 715, 73/727, 721, 756; 361/283.4

(56) References Cited

U.S. PATENT DOCUMENTS

| 4,617,607 | 10/1986 | Park et al. | |
| 4,716,492 | * 12/1987 | Charboneau et al. | 361/283 |
| 4,774,626 | * 9/1988 | Charboneau et al. | 361/283 |
| 4,875,135 | 10/1989 | Bishop et al. | 361/283 |
| 5,329,819 | * 7/1994 | Park et al. | 73/724 |

* cited by examiner

Primary Examiner—Benjamin R. Fuller
Assistant Examiner—Abdullahi Aw-Musse
(74) Attorney, Agent, or Firm—Russell E. Baumann; Frederick J. Telecky, Jr.

(57) ABSTRACT

A capacitive fluid pressure sensor (10, 10', 10") particularly adapted for use with fluids which are incompatible with conventional elastomeric fluid seals is shown in which a thin, relatively flexible metal diaphragm (18, 18', 18") is disposed over a fluid pressure receiving recess (16d, 16d') formed in a bottom wall of a hexport housing (16, 16') and hermetically attached thereto. A capacitive sensor element (12) having a pressure sensitive surface (12b) is disposed in the housing with the pressure sensitive surface placed against the metal diaphragm with a plastic intermediate layer (20, 20', 20", 20''') disposed between the metal diaphragm and the sensor element to minimize hysteresis and output error. The metal diaphragm and plastic layers are shown to be flat members in certain embodiments (18, 18' and 20, 20") and corrugated in another embodiment (18", 20").

11 Claims, 9 Drawing Sheets

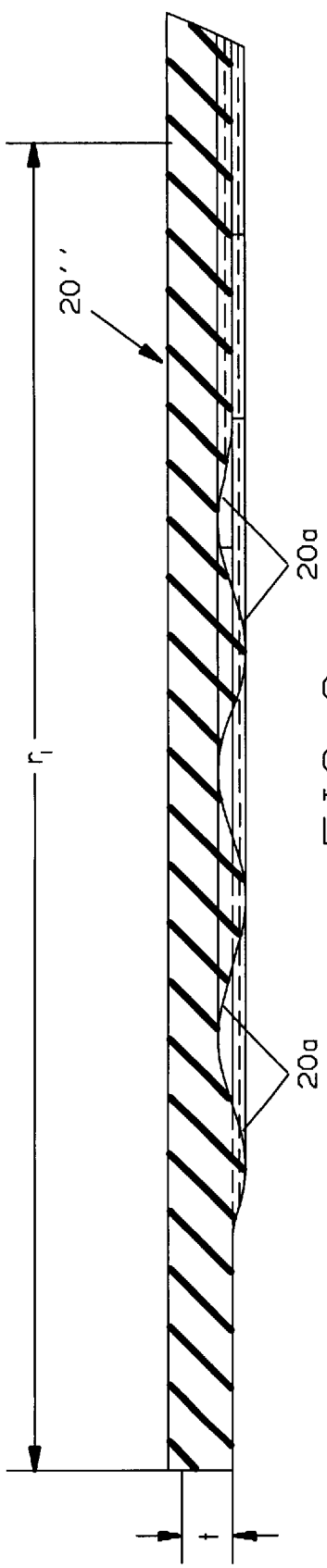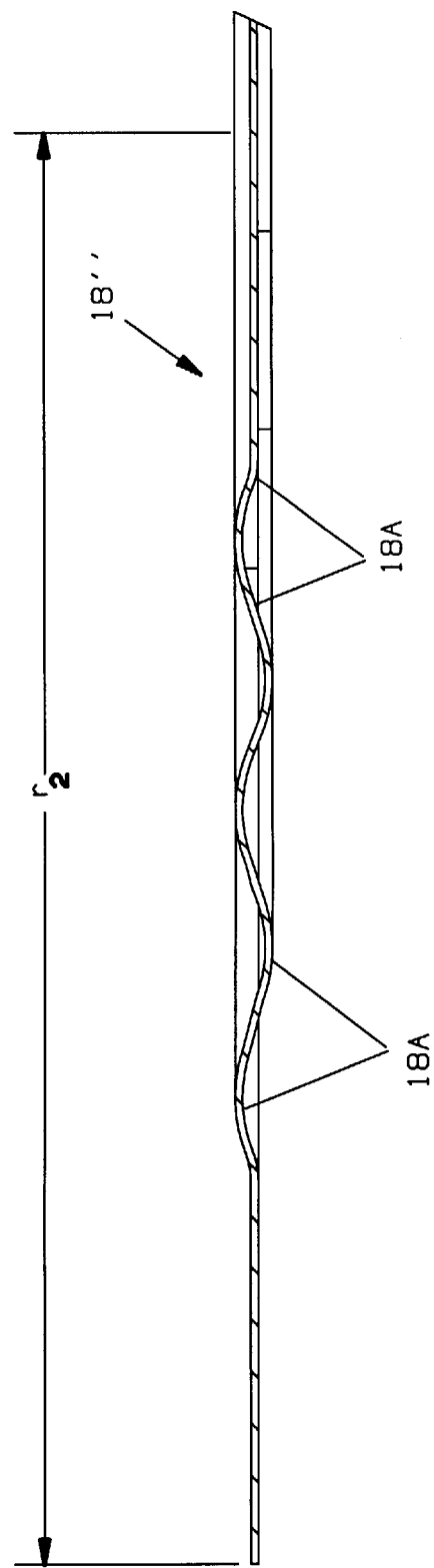

HERMETICALLY SEALED PRESSURE SENSING DEVICE

FIELD OF THE INVENTION

This invention relates generally to condition responsive sensors and more particularly to fluid pressure responsive capacitive transducers.

BACKGROUND OF THE INVENTION

A known pressure sensor as shown in U.S. Pat. No. 4,875,135, assigned to the assignee of the present invention, the subject matter of which is included herein by this reference, comprises a capacitive pressure transducer having a thin ceramic diaphragm mounted in closely spaced, sealed, overlying relation to a ceramic base and having metal coatings deposited on respective opposing surfaces of the diaphragm and base to serve as capacitor plates arranged in predetermined closely spaced relation to each other to form a capacitor. Transducer terminals connected to the capacitor plates are arranged at an opposite surface of the transducer base and a signal conditioning electrical circuit connected to the transducer terminals is mounted on the transducer. A connector body of electrical insulating material is fitted over the electrical circuit and is secured to a metal housing having a cavity in which the transducer is received. The metal housing is formed with a port for connection to a fluid pressure source to be monitored and a flexible O-ring seated in the metal housing around the port with the transducer biased against the O-ring to form a fluid seal and to define a fluid receiving recess with the diaphragm exposed to fluid in the recess. In that arrangement, the diaphragm is movable in response to variation in pressure applied to the diaphragm to vary the capacitance of the capacitor in accordance with the changes in applied pressure and the electrical circuit provides an electrical output signal corresponding to the applied pressure.

Although sensors of the type described have been very successful, there are certain fluids which are corrosive relative to elastomers used for the O-ring seals. By way of example, fluids having ammonia and automotive fluids having certain additives are incompatible with typical elastomers.

It is conventional to place a sensing element in a chamber and to seal the chamber with a flexible diaphragm with the chamber filled with relatively incompressible oil to serve as a pressure transfer fluid. This approach could be used in sensing a condition, such as pressure, of a fluid to be sensed, which fluid is corrosive to the sensing element. However, this represents a relatively expensive solution in manufacturing a suitable package requiring a number of processing steps including evacuation of a chamber and back filling with oil and providing a seal compatible with the pressure of the sensed fluids.

SUMMARY OF THE INVENTION

It is an object of the present invention to provide a fluid pressure sensor free of the above noted prior art limitations. Another object of the invention is to provide a fluid pressure sensor which has a hermetic fluid receiving chamber with a pressure transmitting surface for transferring pressure to the sensor which is accurate with little or no hysteresis and which is reliable and long lasting.

Briefly described, according to the invention, a metal housing having a fluid receiving port leading to a cavity in which a pressure sensing element is received has a flexible metal diaphragm extending over a portion of the cavity which includes the port. The metal diaphragm is hermetically attached to the housing as by welding or brazing. The pressure sensing element having a ceramic pressure sensing diaphragm is placed in the cavity with the ceramic diaphragm disposed against the metal diaphragm but with a thin intermediate layer of plastic material, preferably somewhat resilient, such as elastomeric material, therebetween. The fluid pressure is transferred to the ceramic diaphragm through the flexible metal diaphragm and intermediate layer with the intermediate layer effectively mitigating hysteresis. According to a first preferred embodiment the metal diaphragm and intermediate layer are essentially flat while in a second preferred embodiment both the metal diaphragm and the intermediate layer are formed with a plurality of corrugations to enhance engagement and compliance with the pressure sensing ceramic diaphragm.

BRIEF DESCRIPTION OF THE DRAWINGS

Other objects, advantages and details of the novel and improved pressure sensing device of this invention appear in the following detailed description of preferred embodiments of the invention, the detailed description referring to the drawings in which:

FIG. 6 is an enlarged cross sectional view, similar to FIG. 5, of a broken away portion of the intermediate layer of the FIG. 4 embodiment;

FIG. 7 is an enlarged broken away cross sectional view of a broken away portion of the metal diaphragm of the FIG. 4 embodiment;

DETAILED DESCRIPTION OF PREFERRED EMBODIMENTS

Figure 1:
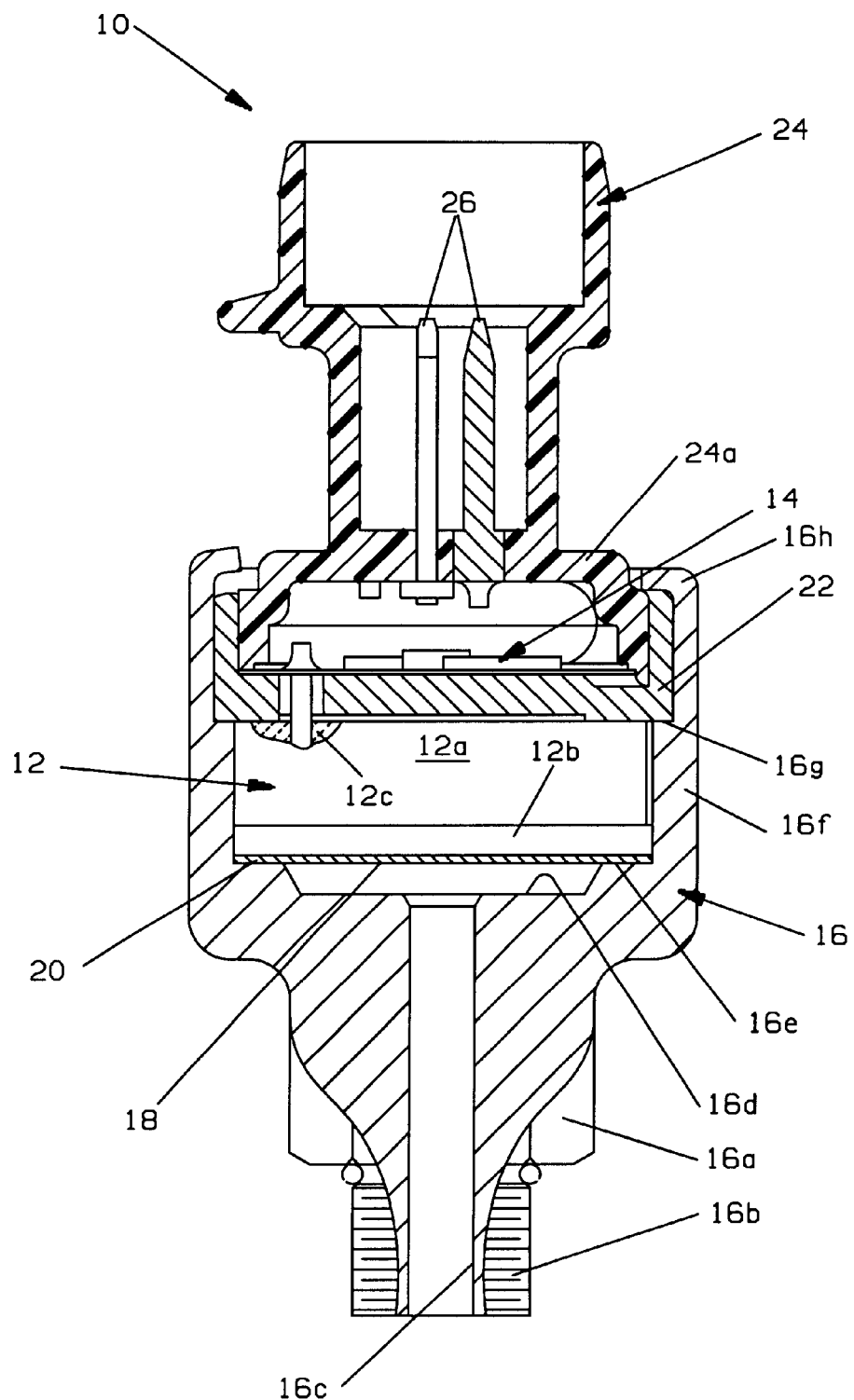
FIG. 1 is an elevational view, partly in cross section, of a hermetically sealed pressure sensing device made in accordance with a first embodiment of the invention.

Referring to the drawings, numeral 10 in FIG. 1 indicates the improved sensor made in accordance with the invention which is shown to comprise a capacitive pressure sensing element or transducer 12 which includes a ceramic base 12a formed of alumina or the like and diaphragm 12b of like material which is mounted on the base in closely spaced, sealed overlying relation thereto. Thin metal coatings (not shown) are disposed on opposing inner surfaces of the base and diaphragm which serve as capacitor plates. Electrical leads, one of which, 12c, is indicated in the figure, extend from the coatings up through the base for attachment to conditioning electronics 14, to be discussed. Transducer 12 is received in a cavity formed in a hexport housing 16 formed of suitable material such as stainless steel. Hexport housing 16 has a base portion preferably formed with hexagonally disposed flat surfaces 16a to facilitate installation using threaded coupling portion 16b. A fluid receiving passageway 16c extends through coupling portion 16b up to a recessed chamber 16d in a bottom wall formed with a circumferentially extending annular platform 16e. In accordance with the invention a thin, flexible metal diaphragm 18 formed of suitable material such as stainless steel is placed on platform 16e and hermetically attached thereto as by welding, brazing or the like. For reasons to be discussed below, an intermediate layer 20 of plastic material, preferably somewhat resilient, such as elastomeric material, is placed over diaphragm 18. By way of example a suitable diaphragm of approximately 2 mils and an intermediate layer of silicone rubber approximately 0.015 inches thick were found to be effective. The intermediate layer serves to support the metal diaphragm and facilitates transference of pressure to ceramic diaphragm 12b.

Hexport housing 16 is formed with a generally cylindrical sidewall 16f and, particularly for sensors to be exposed to relatively high fluid pressures, e.g., up to 2500 psig, preferably a support plate 22 is disposed on a ledge 16g formed in sidewall 16f. Wall 16f is attenuated at 16h to facilitate crimping attachment to a connector 24. Connector 24 is formed of suitable electrically insulative material and has a base portion 24a formed with a recess disposed over support plate 22 which receives conventional conditioning electronics 14 noted above and as disclosed in U.S. Pat. No. 4,875,135, referenced supra. Connector 24 mounts transducer terminals 26, two of which are shown, for attachment to conditioning electronics 14. The attenuated wall portion 16h is crimped over the support plate 22 and the outer peripheral portion of base 24a of the connector to complete assembly of the sensor device. With reference to the figure, attenuated portion 16h is shown partially crimped at the left and fully crimped at the right of the figure. The provision of support plate 22 allows crimping using a relatively high force to withstand the fluid pressure to which the sensor will be exposed without concern that excessive force will be applied to the sensing element 12 by the crimping operation. The outer peripheral portion of ceramic diaphragm 12b of the sensing element is immovable relative to base 12a due to the presence of glass placed therebetween (not shown) to space the diaphragm from the base and seal the cavity between the two members. The immovable portion of the diaphragm is received on platform 16e with recessed chamber 16d aligned with the movable portion of the ceramic diaphragm.

The hermetic seal provided by metal diaphragm 18 eliminates the conventional elastomeric O-ring with the concomitant problem of compatibility with some sensed fluids. Since diaphragm 18 is relatively thin in gauge and therefor reasonably compliant, fluid pressure is transferred through the metal diaphragm to sensing element 12.

Figure 9:
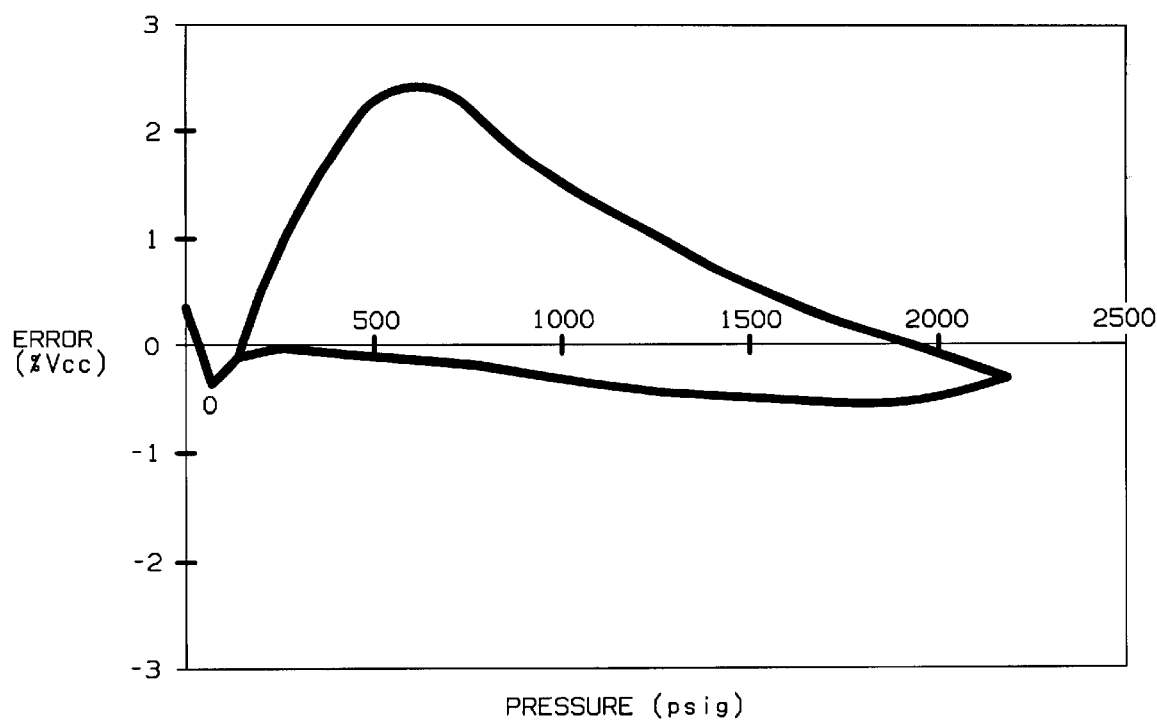
FIG. 9 is an error vs. pressure diagram for a flat metal diaphragm with no intermediate layer.
Figure 10:
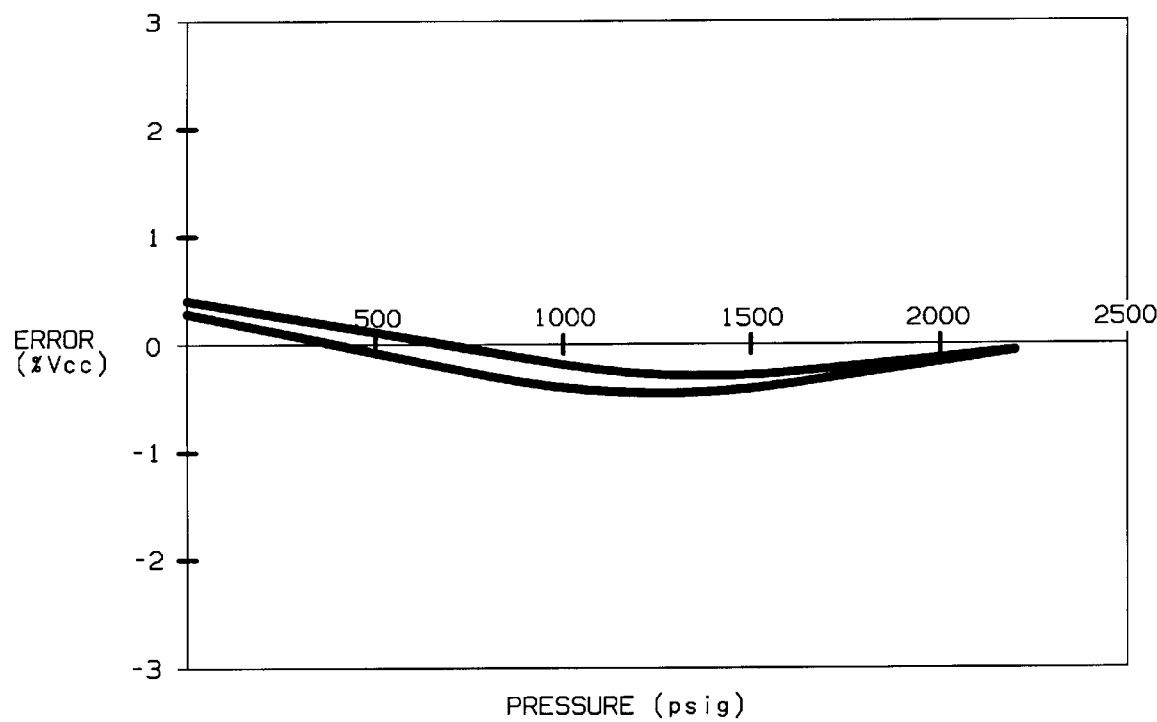
FIG. 10 is an error vs. pressure diagram for a flat metal diaphragm with an elastomeric intermediate layer.

Use of a metal diaphragm in direct contact with the sensing element, however, results in unacceptable levels of hysteresis and error. This is illustrated by a typical error (percent $V_{cc}$) vs. pressure (psig) graph shown in FIG. 9. The sensing device used to provide data for this graph comprised a 0.003 inch thick stainless steel flat diaphragm 18 with no intermediate layer at room temperature. A similar test taken at room temperature for a sensing device made in accordance with the invention having a 0.003 inch thick stainless steel diaphragm 18 along with a silicone rubber intermediate layer 20, 0.015 inch thick, is shown in FIG. 10. Use of the intermediate elastomeric layer 20, placed between the metal diaphragm and the sensing element, significantly reduces the hysteresis and error to a level which meets present accuracy specifications, e.g., on the order of 1% or less of full scale.

Figure 2:
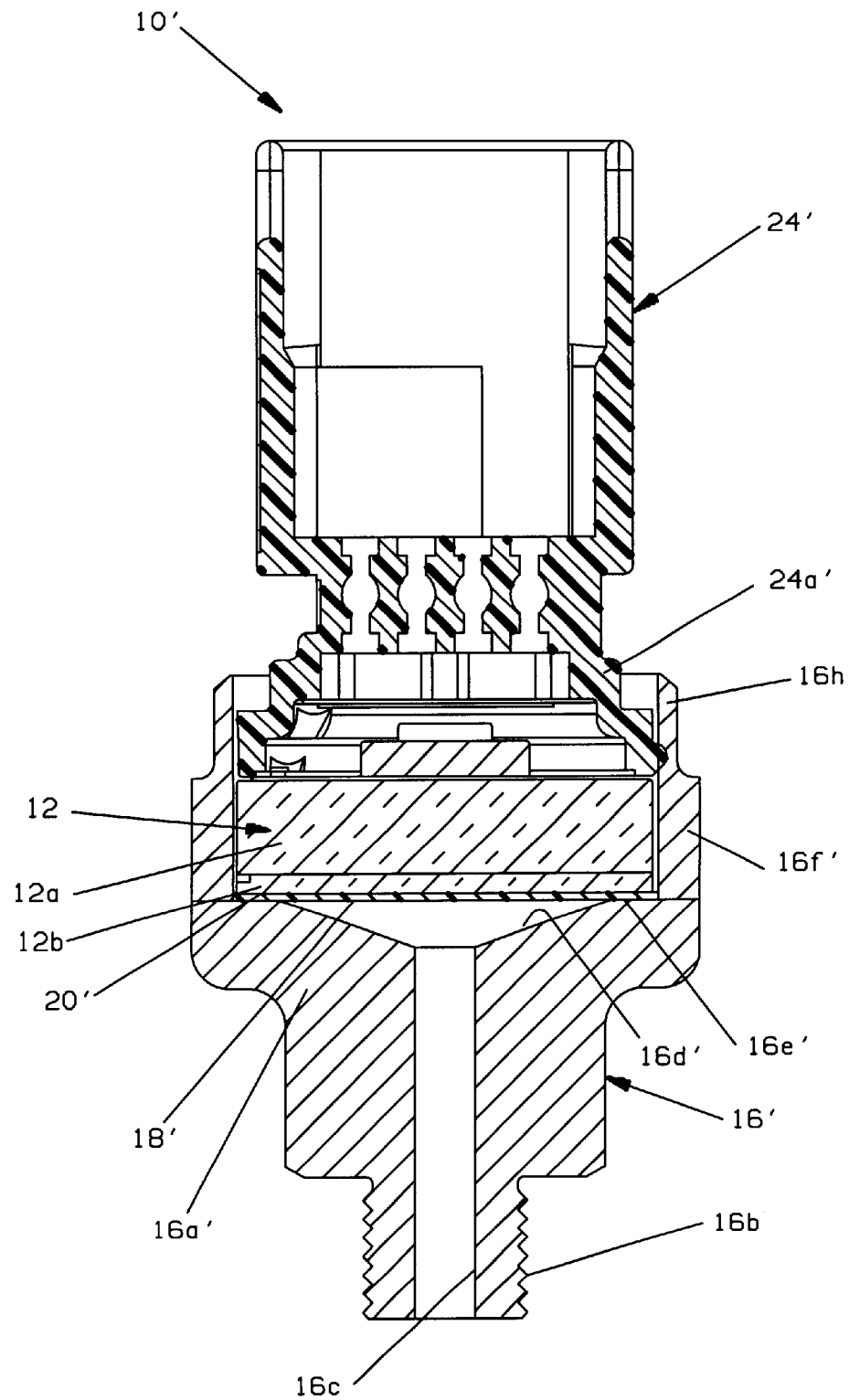
FIG. 2 is an elevational view, in cross section, of a modification of the FIG. 1 embodiment, shown with certain parts removed for purposes of illustration.
Figure 3:
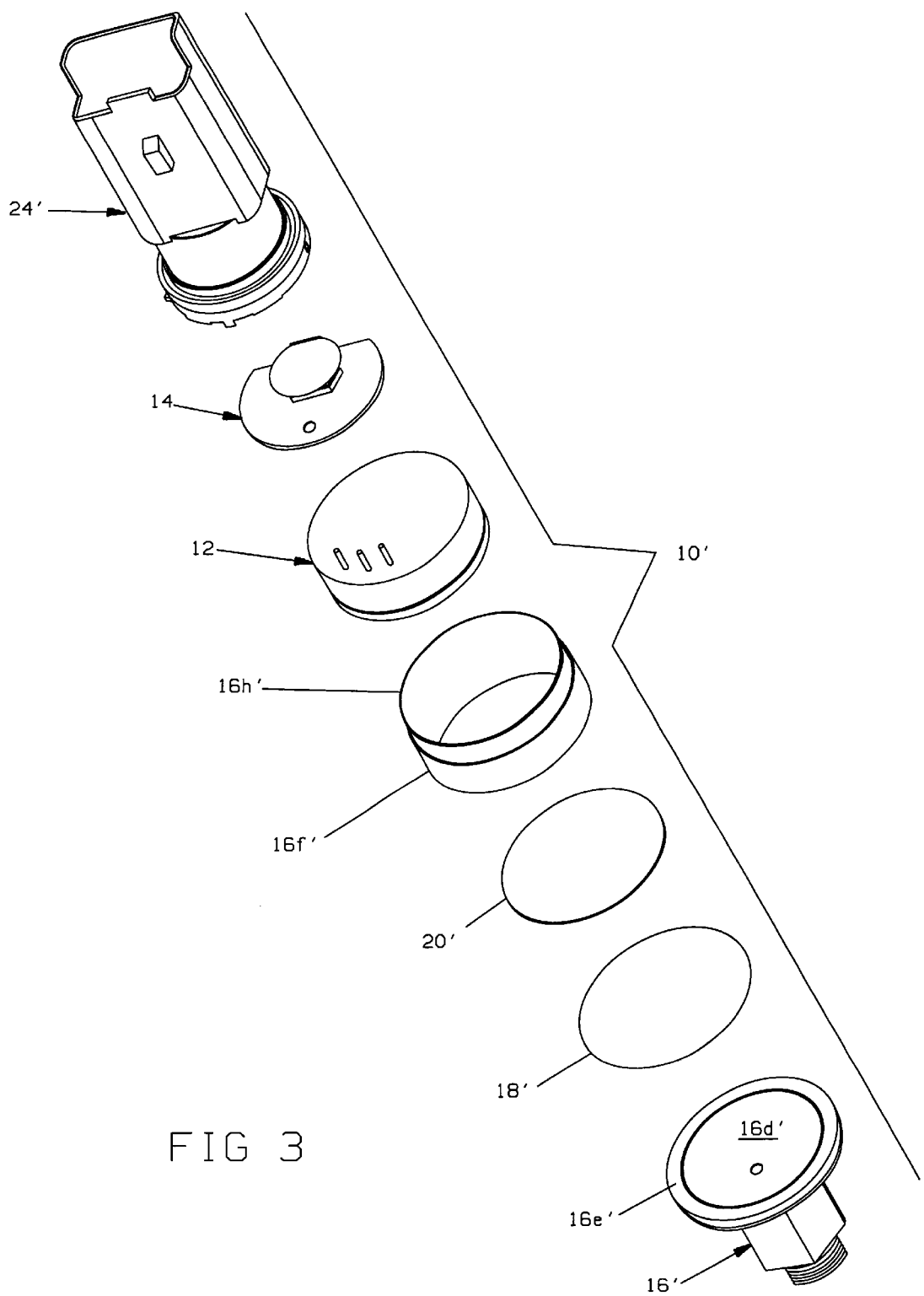
FIG. 3 is an exploded perspective view of the FIG. 2 modification.
Figure 4:
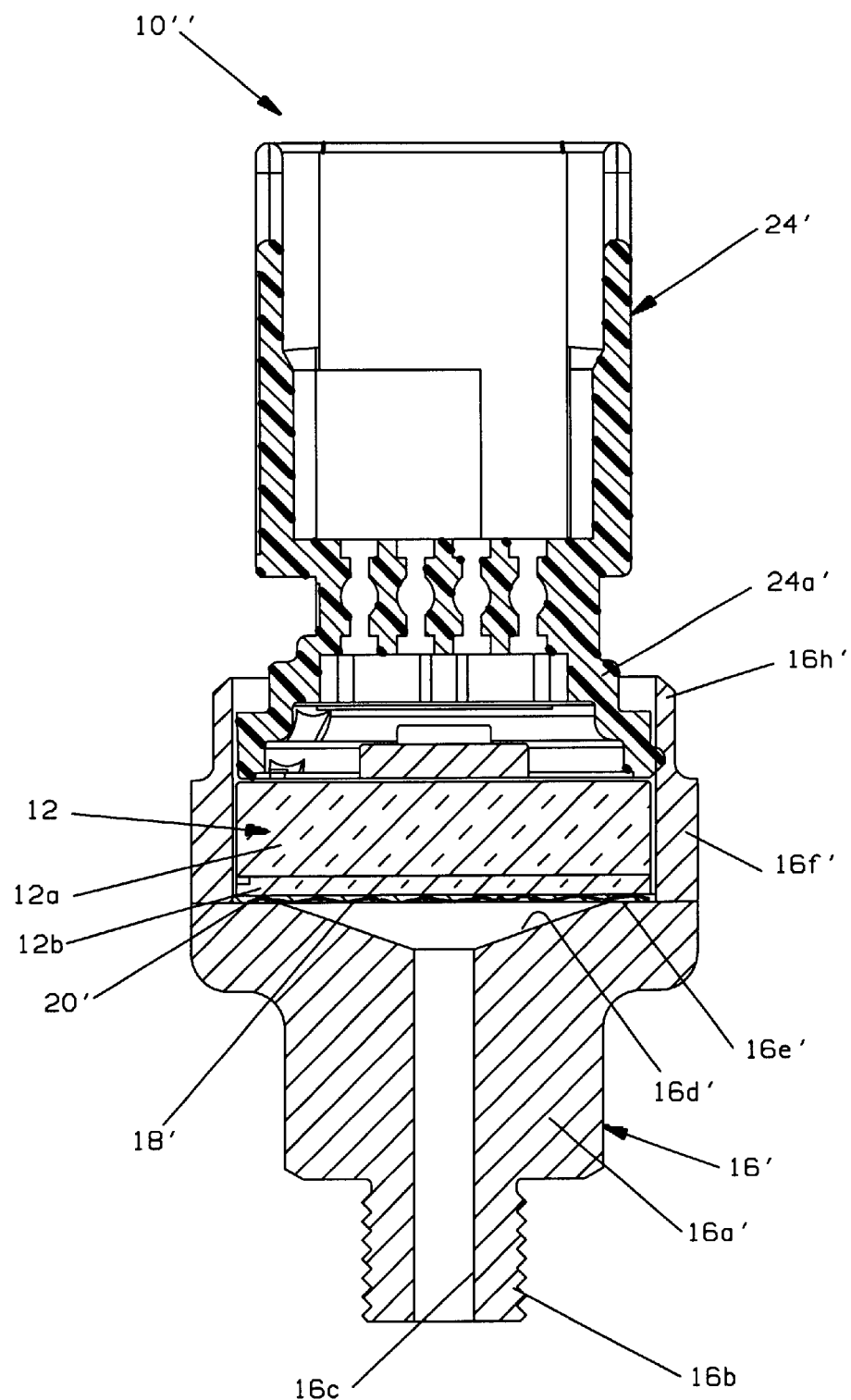
FIG. 4 is a view similar to FIG. 2 of another embodiment of the invention.

FIGS. 2 and 3 show a modified embodiment 10' particularly useful for somewhat lower pressure ranges relative to the FIG. 1 embodiment, e.g., 0 to 100–500 psig. Hexport housing 16' comprises a metal base portion 16a' in which platform 16e' extends radially to the outer peripheral surface of the base portion. Metal diaphragm 18', formed with a diameter essentially the same as the outer diameter of platform 16e', is placed on the platform surface and a separate metal sleeve 16f' having a corresponding outer diameter is placed over the diaphragm on the platform and the three members are welded together to form a unitary hexport housing and diaphragm assembly. Elastomeric intermediate layer 20 having a diameter to closely fit in the bore formed by the wall of sleeve 16f' is then placed on the metal diaphragm and the sensor element 12, conditioning electronics 14 and connector 24' are then assembled with the attenuated wall portion 16h' crimped directly onto the base 24a' of the connector (the wall portion 16h' shown in the drawing prior to crimping). The sensor terminals 26 have not been shown in the drawings for reasons of simplicity of illustration. If desired, a crimp ring comparable to member 22 of FIG. 1 could be provided however, since the sensor is intended for a lower pressure range, less force is needed in crimping wall portion 16h' thereby making dimensional control for the sensing element easier to maintain.

Figure 5:
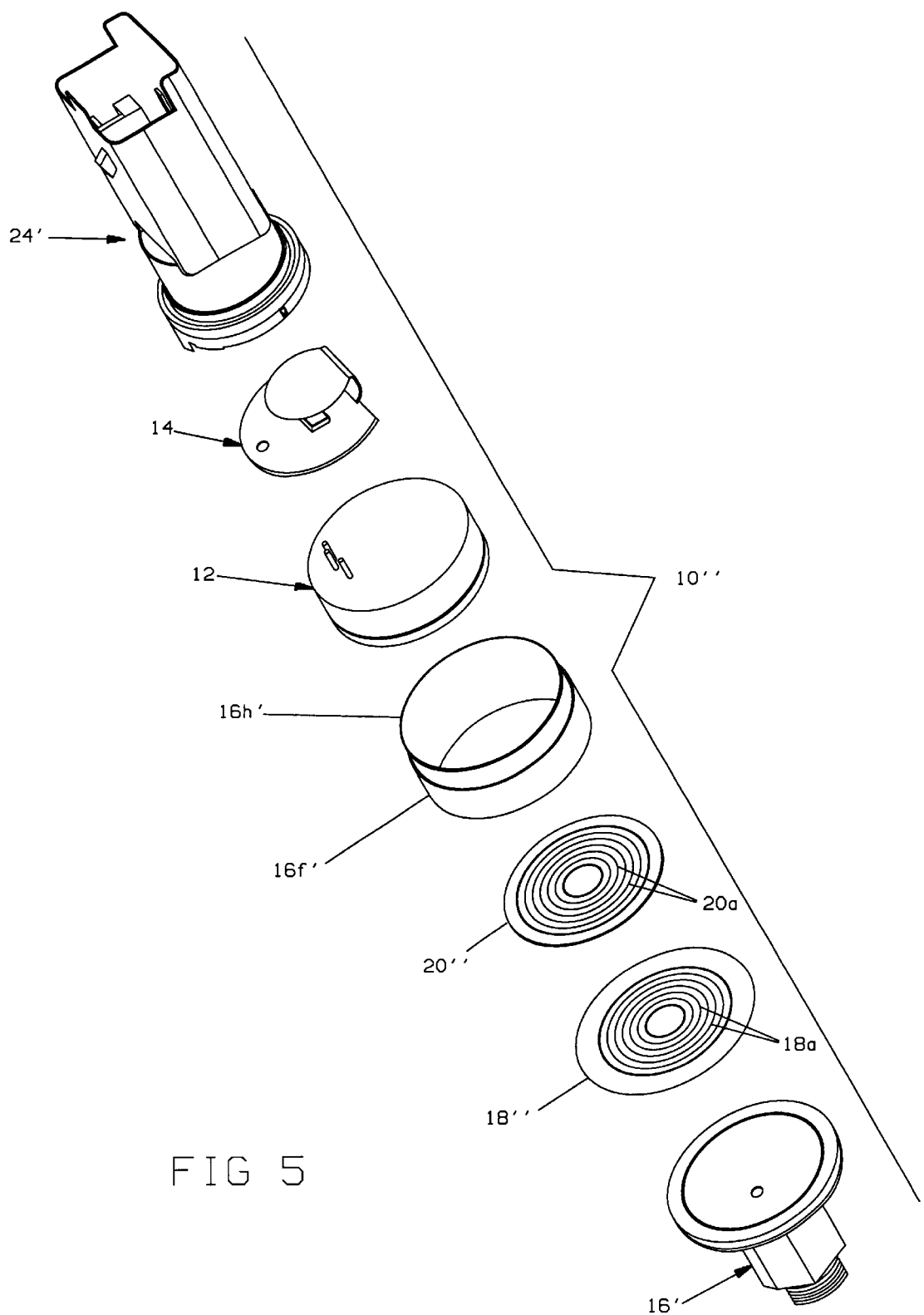
FIG. 5 is an exploded perspective view of the FIG. 4 embodiment.

FIGS. 4–7 show another modified embodiment, the same as the FIGS. 2 and 3 embodiment, except for the metal diaphragm and intermediate layer. As best seen in FIGS. 5–7, metal diaphragm 18" and intermediate layer 20" are each provided with matching corrugations 18a, 20a, respectively, to enhance their compliance with the ceramic diaphragm. As in the FIGS. 2, 3 embodiment, the thickness t of intermediate layer 20" is substantially thicker than the metal diaphragm 18", e.g., 0.015 inch and 0.002 inch, respectively. The radius $r_2$ of metal diaphragm 18" is greater than the radius $r_1$ of intermediate layer 20" to permit sleeve 16f' to be received over the outer periphery thereof so that the several members can be welded together to form a hermetic seal.

Figure 11:
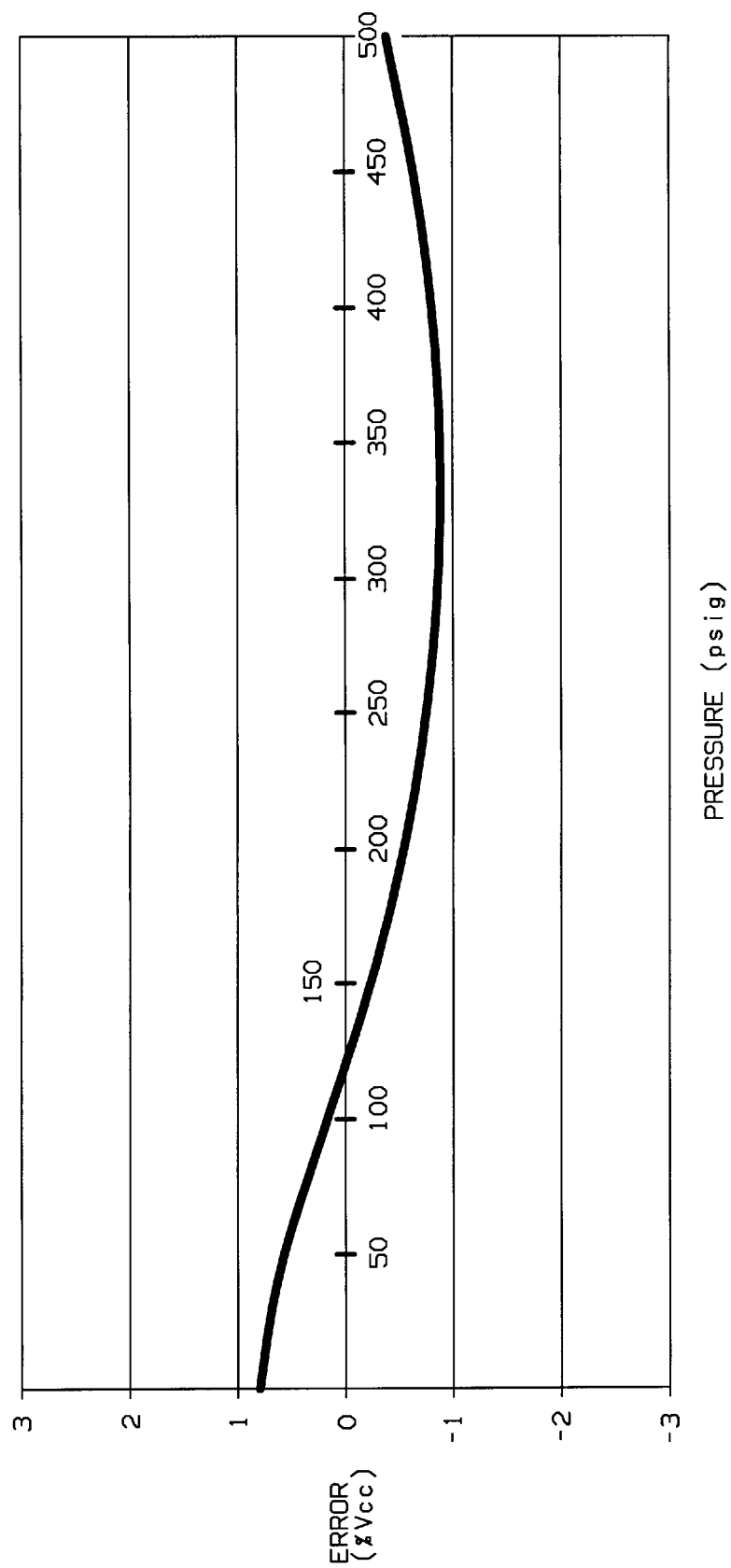
FIG. 11 is an error vs. pressure diagram for a corrugated metal diaphragm and intermediate layer.

FIG. 11 shows the error vs. pressure curve for a test taken at a temperature of 25° C. for the FIGS. 4–7 embodiment.

Figure 8:
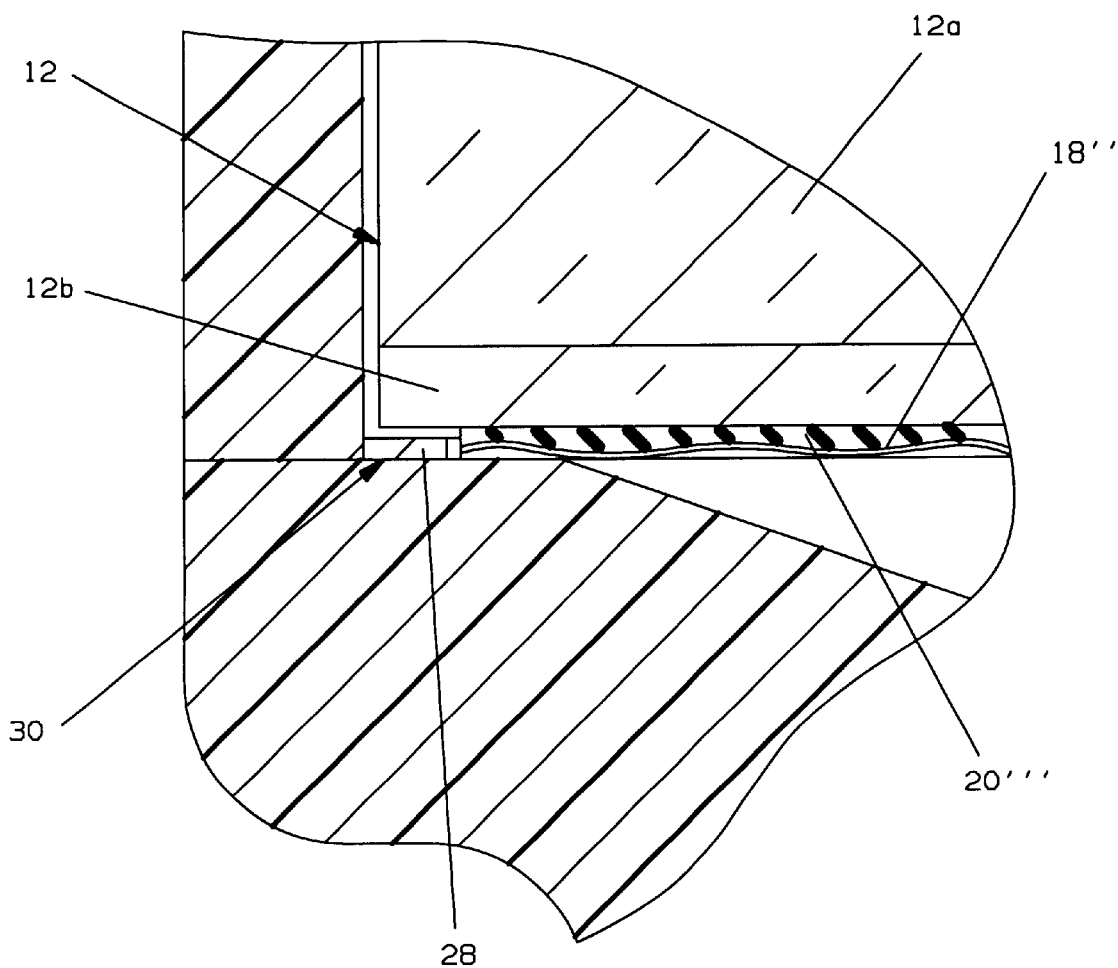
FIG. 8 is an enlarged view of a combination crimp ring/intermediate layer useful in a modified embodiment.

FIG. 8 shows a combination crimp ring and intermediate layer 30 which can be used to more easily accommodate crimping of wall portion 16h' without adversely affecting the dimensional relationship of the sensor element 12 and the intermediate layer. Combination crimp ring and intermediate layer 30 comprises an intermediate layer 20''' formed of plastic, as described in the above embodiments along with an annular ring 28 having a thickness less than that of layer 20''' and formed of suitable relatively rigid material, such as stainless steel. Layer 20''' and ring 28 can be separate elements or can be integrally formed, as desired. Ring 28 will allow a limited amount of compression of layer 20''' before transducer 12 bottoms out on the ring thereby preventing further movement. Metal diaphragm 18" is the same as in the FIGS. 4–7 embodiment.

Although the metal diaphragm and the plastic intermediate layer have been shown as separate components in the above embodiments it will be appreciated that the plastic material could be coated or otherwise deposited on the metal diaphragm, if desired. It is also within the purview of the invention to form the intermediate layer out of a plurality of layers of either the same or different materials, e.g., a layer of silicone rubber and a layer of Teflon.

It should be understood that although particular embodiments of the invention have been described by way of illustrating the invention, the invention includes all modifications and equivalents thereof falling within the scope of the appended claims.

What is claimed:

1. A fluid pressure sensor having an improved fluid seal comprising a capacitive pressure transducer having a first surface to be exposed to a fluid pressure to provide a capacitance value which varies with the fluid pressure applied and having transducer terminals disposed at a second opposite surface, a connector body having connector terminals therein, a housing for forming a chamber therebetween, an electrical circuit disposed in the chamber electrically connected to the transducer and connector terminals for providing an electrical signal corresponding to the applied pressure, the housing having a transducer receiving cavity defined by a bottom wall and a sidewall extending upwardly from the bottom wall, the bottom wall formed with a fluid pressure receiving recess, a fluid pressure port formed in the housing in communication with the recess, a separate thin, flexible metal diaphragm secured to the bottom wall circumscribing the recess in fluid sealing relation therewith, the transducer received in the transducer receiving cavity with the first surface overlying the bottom wall and a thin layer of plastic material disposed intermediate the first surface of the capacitive pressure transducer and the metal diaphragm in direct contract with both of them.

2. A fluid pressure sensor according to claim 1 in which the plastic material is elastomeric.

3. A fluid pressure sensor according to claim 2 in which the elastomeric material comprises silicone rubber.

4. A fluid pressure sensor according to claim 2 in which the plastic material includes a layer of Teflon.

5. A fluid pressure sensor according to claim 1 in which the diaphragm is corrugated and the plastic material comprises a layer corrugated to conform with the corrugations of the diaphragm to enhance support the diaphragm.

6. A fluid pressure sensor according to claim 1 in which the housing is formed of a first base portion which includes the bottom wall and a second sidewall portion is received on the bottom wall with an outer peripheral portion of the metal diaphragm interposed between the first base portion and the second sidewall portion; the first base portion, the metal diaphragm and the second sidewall portion welded together to form a hermetic seal.

7. A fluid pressure sensor according to claim 1 in which the metal diaphragm is approximately 0.002 inch thick and the plastic intermediate layer is approximately 0.015 inch thick.

8. A fluid pressure sensor according to claim 5 in which the metal diaphragm is approximately 0.002 inch thick and the plastic intermediate layer is approximately 0.015 inch thick.

9. A fluid pressure sensor having an improved fluid seal comprising a capacitive pressure transducer having a first surface to be exposed to an applied fluid pressure to provide a capacitance value which varies with the fluid pressure applied, a housing having a transducer receiving cavity defined by a bottom wall and a sidewall extending upwardly from the bottom wall, the bottom wall formed with a fluid pressure receiving recess, a fluid pressure port formed in the housing in communication with the recess, a separate thin, flexible metal diaphragm secured to the bottom wall circumscribing the recess in fluid sealing relation therewith, the transducer received in the transducer receiving cavity with the first surface overlying the bottom wall and a thin layer of synthetic material disposed intermediate the first surface of the capacitive pressure transducer and the metal diaphragm in direct contact with both of them.

10. A pressure sensor according to claim 9 in which the synthetic material comprises silicone rubber.

11. A pressure sensor according to claim 8 in which the diaphragm is corrugated and the synthetic material comprises a layer corrugated to conform with the corrugations of the diaphragm to fully support the diaphragm when exposed to high pressure conditions.

* * * * *